United States Patent
Fachat et al.

(10) Patent No.: US 8,662,835 B2
(45) Date of Patent: Mar. 4, 2014

(54) NOZZLE FOR A TURBOMACHINE TURBINE

(75) Inventors: Thierry Fachat, Moissy Cramayel (FR); Patrick Joseph Marie Girard, Saint Fargeau Ponthierry (FR); Jean-Luc Soupizon, Vaux le Penil (FR)

(73) Assignee: SNECMA, Paris (FR)

( * ) Notice: Subject to any disclaimer, the term of this patent is extended or adjusted under 35 U.S.C. 154(b) by 570 days.

(21) Appl. No.: 12/922,461

(22) PCT Filed: Mar. 13, 2009

(86) PCT No.: PCT/FR2009/000268
§ 371 (c)(1),
(2), (4) Date: Feb. 11, 2011

(87) PCT Pub. No.: WO2009/118490
PCT Pub. Date: Oct. 1, 2009

(65) Prior Publication Data
US 2011/0127352 A1 Jun. 2, 2011

(30) Foreign Application Priority Data
Mar. 19, 2008 (FR) ...................................... 08 01502

(51) Int. Cl.
*F04D 29/08* (2006.01)

(52) U.S. Cl.
USPC .................. 415/173.5; 415/173.6; 415/174.5

(58) Field of Classification Search
USPC .......... 415/173.1, 173.5, 173.6, 173.7, 174.5, 415/230, 231
See application file for complete search history.

(56) References Cited

U.S. PATENT DOCUMENTS

| 2,963,307 | A | | 12/1960 | Bobo | |
| 4,239,451 | A | * | 12/1980 | Bouru | 415/173.7 |
| 4,767,267 | A | | 8/1988 | Salt et al. | |
| 5,215,435 | A | | 6/1993 | Webb et al. | |
| 6,139,264 | A | * | 10/2000 | Schilling | 415/174.2 |
| 2003/0146578 | A1 | | 8/2003 | Girard et al. | |
| 2004/0042898 | A1 | | 3/2004 | Drerup et al. | |
| 2007/0286719 | A1 | * | 12/2007 | Duesler et al. | 415/191 |
| 2009/0004006 | A1 | * | 1/2009 | Dejaune et al. | 416/95 |
| 2009/0129916 | A1 | * | 5/2009 | Young et al. | 415/115 |

FOREIGN PATENT DOCUMENTS

| EP | 1 335 113 | 8/2003 |
| GB | 2 022 720 | 12/1979 |
| GB | 2 198 489 | 6/1988 |

* cited by examiner

*Primary Examiner* — Edward Look
*Assistant Examiner* — William Grigos
(74) *Attorney, Agent, or Firm* — Oblon, Spivak, McClelland, Maier & Neustadt, L.L.P.

(57) ABSTRACT

A turbine nozzle for a turbomachine, including inner and outer annular platforms connected together by vanes, the inner platform carrying annular elements of abradable material co-operating with annular wipers of a rotor of the turbomachine to form a labyrinth seal, these elements of abradable material being carried by annular sheet-metal sectors of substantially L-, S-, or C-shaped section that are fastened by brazing or welding at their outer peripheries to the inner platform and at their inner peripheries to the elements of abradable material.

10 Claims, 2 Drawing Sheets

NOZZLE FOR A TURBOMACHINE TURBINE

BACKGROUND OF THE INVENTION

1. Field of the Invention

The present invention relates to a nozzle for the turbine of a turbomachine such as an airplane turboprop or turbojet.

2. Description of the Related Art

A turbomachine turbine comprises a plurality of stages each having a bladed wheel and a nozzle. Each bladed wheel comprises a disk carrying substantially radial blades on its outer periphery, the disks of the various wheels being connected to one another along a common axis and being connected to a drive shaft of the turbine rotor by appropriate means.

Each nozzle comprises an inner annular platform and an outer annular platform with substantially radial vanes extending between them. The outer platform of the nozzle includes means for engaging and fastening to an outer casing of the turbine. The inner annular platform carries annular elements of abradable material for co-operating with outer annular wipers of a rotor element so as to form a labyrinth type seal. The seal serves to ensure that the flow of air passes axially through the annular space between the inner periphery of the nozzle and the rotor of the turbine.

In the present state of the art, the abradable material elements are carried by an annular ring that is connected to the inner platform of the nozzle by a radial wall. The ring, the radial wall, and the inner platform of the nozzle are formed as a single casting having considerable thicknesses and thus of relatively high weight.

That known technique presents another major drawback. In operation, the nozzle vanes are exposed to hot gas flowing in the flow section of the turbine. The temperature of the gas in the flow section is relatively high, typically of the order of 900° C., while the temperature in the zone between the inner platform of the nozzle and the rotor is lower, e.g. about 700° C. The thickness of the platform and of the means supporting the abradable elements cause them to present considerable thermal inertia which, combined with the lower temperature to which they are subjected, opposes thermal expansion of the vanes of the nozzle, which values are then subjected to high levels of mechanical stress. This gives rise to the appearance of cracks and fissures in the vanes causing their lifetime to be significantly reduced.

Proposals have already been made to fasten the abradable elements on pieces of sheet metal that are themselves fastened to an inner radial rim of the inner platform by fastener means of nut-and-bolt or analogous type. Unfortunately, such fastener means occupy a relatively large amount of axial and radial space, and using them significantly increases the size and weight of the nozzle.

BRIEF SUMMARY OF THE INVENTION

A particular object of the invention is to provide a solution to these problems that is simple, effective, and inexpensive.

To this end, the invention provides a turbine nozzle for a turbomachine, the nozzle comprising two annular platforms, respectively an inner platform and an outer platform, interconnected by substantially radial vanes, the inner platform carrying annular elements of abradable material for co-operating with annular wipers of a rotor of the turbomachine in order to form a labyrinth type seal, the nozzle being characterized in that the annular elements of abradable material are carried by annular sheet-metal sectors of substantially L-, S-, or C-shaped section that are mounted radially inside the inner platform and each of which is fastened by brazing or welding at its outer periphery to the inner platform and at its inner periphery to an element of abradable material or to a piece of sheet metal fastened to an element of abradable material.

The invention makes it possible to reduce significantly both the weight of the support means for the abradable material elements, and also the thickness and the thermal inertia of said means, in comparison with the prior art. The sheet-metal sectors are of a thickness that is considerably smaller than that of the castings used in the prior art.

Furthermore, the sheet-metal sectors are fastened in simple manner by welding or brazing directly to the inner platform of the nozzle without using any heavy and bulky nut-and-bolt type fastener means. The vanes of the nozzle are thus freer to expand thermally in operation, thereby reducing stresses and enabling the lifetime of the nozzle to be increased.

Preferably, each sheet-metal sector has a radial wall with a cylindrical inner peripheral rim and is fastened via its outer peripheral edge to the inner platform. The outer periphery of the radial wall of each sheet-metal sector may be pressed against and fastened to an inner radial rib of the platform. In a variant, each sheet-metal sector has a cylindrical outer peripheral rim pressed against and fastened to the inside surface of the inner platform.

The abradable material elements may be fastened to the inside surfaces of the cylindrical rims of the sheet-metal sectors, or optionally to sectors of a second piece of substantially cylindrical sheet metal, which sectors are fitted on and fastened to the inner surfaces of the cylindrical rims of the first sheet-metal sectors.

Advantageously, the sheet-metal sectors have rims extending towards the adjacent rotor disks so as to limit the flow of hot gas in a radial direction from the flow section of the turbine radially inwards into the annular gaps housing the labyrinth seals. The rims of the sheet-metal sectors may be formed, for example, by annular pieces of sheet metal fastened to the sheet-metal sectors by brazing or welding.

The inner platform of the nozzle of the invention is preferably formed by a sectorized cylindrical wall, the sectors of the platform being castings and carrying sealing strips that are welded or brazed at one end to a platform sector and that are pressed in sliding contact at their other end to an adjacent platform sector in register with the sheet-metal sectors carrying the element of abradable material.

The invention also provides a turbomachine turbine, characterized in that it includes a nozzle of the above-specified type, and it also provides a turbomachine such as an airplane turboprop or turbojet characterized in that it includes a turbine fitted with at least one nozzle as described above.

BRIEF DESCRIPTION OF THE SEVERAL VIEWS OF THE DRAWINGS

The invention can be better understood and other details, characteristics, and advantages of the present invention appear more clearly on reading the following description made by way of non-limiting example and with reference to the accompanying drawings, in which.

DETAILED DESCRIPTION OF THE INVENTION

Figure 1:
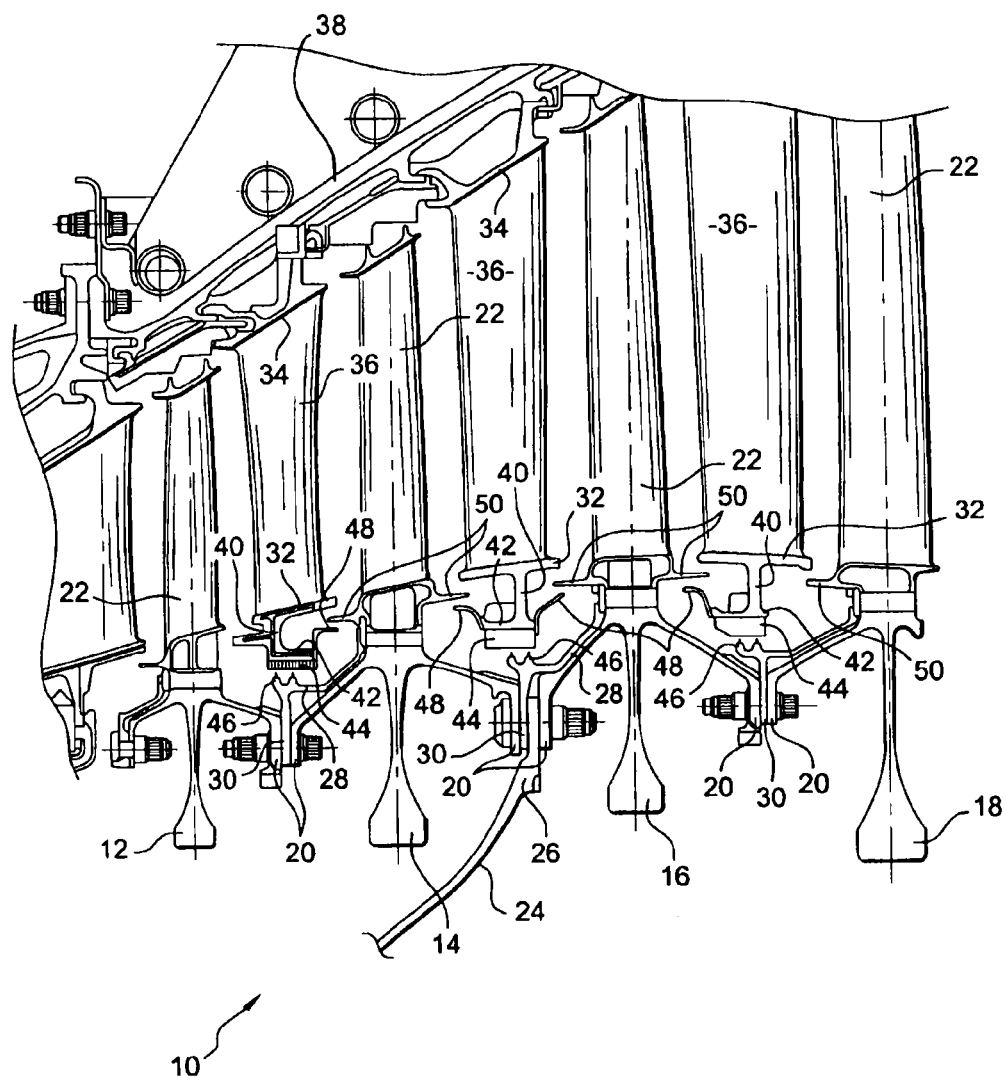
FIG. 1 is a diagrammatic half-view in axial section of a low-pressure turbine of a turbomachine, including nozzles of the prior art.

Reference is made initially to FIG. 1 which is a diagrammatic half-view in section of a low-pressure turbine 10 of a turbomachine on a plane containing the axis of rotation of the turbine rotor.

The turbine rotor has four disks 12, 14, 16, and 18 that are assembled one after another on a common axis by annular flanges 20 that carry annular rows of movable blades 22 that are mounted via blade roots, e.g. of dovetail or analogous shape, at their radially-inner ends to the outer peripheries of the disks 12, 14, 16, and 18. The rotor is connected to a turbine shaft via a drive cone 24 fastened by means of an annular flange 26 between the annular flanges 20 of the disks 14 and 16.

Annular plates 28 for axially retaining the movable blades on the disks are also mounted between the disks 12, 14, 16, and 18, each annular plate comprising a radial wall 30 clamped axially between the annular flanges 20 of two adjacent disks.

Between the rows of movable blades 22 there are nozzles, each comprising two annular platforms 32, 34, respectively an inner platform and an outer platform, interconnected by an annular row of stationary vanes 36. The outer platforms 34 of the nozzles are fastened by appropriate means to a casing 38 of the low-pressure turbine. Each nozzle inner platform 32 comprises a radial wall 40 that extends radially inwards from an inside surface of the platform and that is connected at its inner periphery to a cylindrical ring 42 for supporting annular elements 44 of abradable material.

These abradable elements 44 are arranged radially on the outside facing outer annular wipers 46 carried by the plates 28. The wipers 46 are designed to co-operate with the elements 44 by rubbing against them so as to form labyrinth seals and limit the flow of air in the axial direction through these seals.

The cylindrical ring 42 includes annular rims 48 on its upstream and downstream sides, which rims extend substantially axially away from the radial wall 40 of the nozzle inner platform 32. Substantially cylindrical upstream and downstream spoilers 50 are formed projecting axially from the roots of the movable blades 22 and they co-operate by the baffle effect with these annular rims 48 and with the upstream and downstream edges of the inner platforms 32 to limit the flow of hot gas from the turbine stream radially inwards through the labyrinth seals.

The ring 42 and the radial wall 40 of each nozzle are made as a single casting together with the inner platform 32 of the nozzle, thereby giving rise to numerous drawbacks as described above.

The invention makes it possible to remedy these problems at least in part by fastening the abradable element 44 to the nozzle platform 32 by means of annular sheet-metal sectors, these sheet-metal sectors being brazed or welded to the abradable elements and to the nozzle inner platform.

Figure 2:
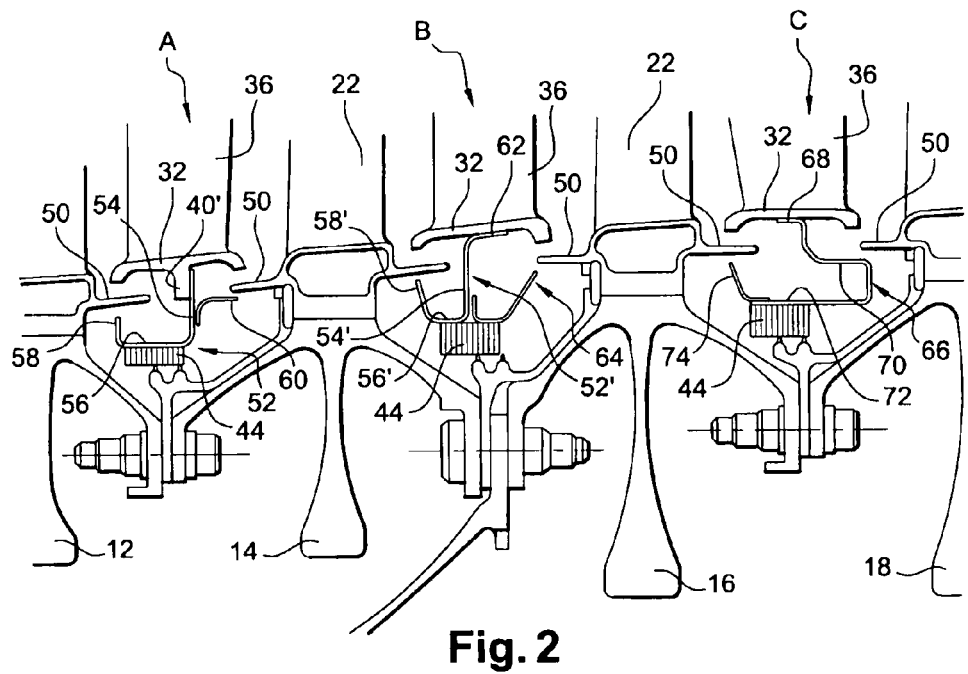
FIG. 2 is a fragmentary diagrammatic half-view of a low-pressure turbine of a turbomachine fitted with nozzles of the invention.

In the embodiment of FIG. 2, the turbine has three nozzles A, B, and C, each of which is fitted with sheet-metal sectors of a particular type.

The inner platform 32 of the upstream nozzle A has a radial rib 40' extending inwards from the inside surface of the platform. This radial rib 40' presents a thickness and a radial dimension that are considerably smaller than the thickness and the radial dimension of the radial wall 40 in FIG. 1.

The sheet-metal sectors 52 for supporting the abradable elements 44 present a section that is substantially L-shaped, each having a radial wall 54 that is connected at its inner periphery to the downstream end of a cylindrical wall 56 whose upstream end is connected to an outer radial rim 58. The outer periphery of the radial wall 52 is pressed against the downstream face of the radial rib 40' of the nozzle A and is fastened thereto by welding or brazing. The abradable elements 44 are fastened by brazing or welding to the inside surfaces of the cylindrical walls 56 of the sheet-metal sectors. The rims 58 of the sheet-metal sectors extend outwards to a small radial distance from the downstream spoiler 50 of the rotor disk 12 situated upstream from the nozzle A.

An annular piece of sheet metal 60 of L-shaped section is arranged downstream from the sheet-metal sectors 52 and includes a radial upstream portion pressed against the downstream faces of the radial walls 54 of the sheet-metal sectors 52 and fastened thereto by welding or brazing, and a cylindrical portion that extends downstream radially on the inside and at a small radial distance from the upstream spoiler 50 of the rotor disk 14 situated directly downstream from the nozzle A.

The downstream spoiler of the disk 12 and the upstream spoiler of the disk 14 co-operate by the baffle effect respectively with the upstream edge of the platform 32 of the nozzle A and the outer rims 58 of the sheet-metal sectors 52, and with the downstream edge of the platform 32 and the cylindrical piece of sheet-metal 60 so as to limit the flow of hot gas in a radial direction from the turbine flow section into the annular space housing the labyrinth seal.

The support means for the abradable elements 44 of the intermediate nozzle B comprise annular sheet-metal sectors 52' that are similar to the sheet-metal sectors 52 of the nozzle A, the radial wall 54' of each sheet-metal sector also being connected at its outer periphery to a cylindrical rim 62 facing downstream and pressed against the inside surface of the inner platform 32 and fastened thereto by welding or brazing. This platform 32 does not have a radial wall 40 or a radial rib 40'. The sheet-metal sectors 52' are generally S-shaped in section.

An annular piece of sheet metal 64 of substantially U-shaped section is also fastened by welding or brazing to the sheet-metal sectors 52' and to the abradable elements 44. This piece of sheet metal 64 includes an upstream annular tab that extends radially outwards and that is pressed against and fastened to the downstream faces of the radial walls 54' of the piece of sheet-metal sectors 52'. The substantially cylindrical middle portion 56' of the sheet metal 64 is fastened to the abradable elements. The downstream annular tab of the sheet metal 52' extends frustoconically downstream and outwards, its downstream end being situated radially inside and at a small radial distance from the upstream spoiler 50 of the disk 16.

The spoilers 50 of the disks 14, 16 co-operate by the baffle effect with the upstream and downstream edges of the platform 32 of the nozzle B, the upstream rims 58' of the sheet-metal sectors 52', and the downstream tab of the sheet metal 64, as described above.

The support means fitted to the downstream nozzle C comprise annular sheet-metal sectors 66 of substantially C-shaped or U-shaped section with their open sides facing axially upstream. Each sheet-metal sector 66 has a radially-outer cylindrical rim 68 that is pressed against the inside surface of the platform 32 (identical to the platform of the nozzle B) and that is fastened thereto by welding or brazing. The downstream end of the rim 68 is connected to the outer periphery of an angled annular wall 70 that extends inwardly from upstream to downstream and that has its inner periphery connected to the downstream end of an inner cylindrical wall 72. The elements 44 of abradable material are fastened to the inside surfaces of these cylindrical walls 72. The downstream end portion of the annular wall 70 is situated radially inside and close to the upstream spoiler 50 of the disk 18 to limit leakage of air between the wall 70 and the spoiler 50.

An annular piece of sheet metal 74 of substantially L-shaped section is fastened by welding or brazing at its downstream end to the outside surfaces of the cylindrical walls 72 of the sheet-metal sectors. The upstream end portion of said piece of sheet metal 74 extends radially outwards to the vicinity of the downstream spoiler 50 of the nozzle B. This spoiler 50 co-operates by the baffle effect with the upstream edge of the platform 32 of the nozzle C and with the piece of sheet metal 74.

The nozzle C does not have any sheet metal downstream from the sheet-metal sectors 66 for co-operating with the upstream spoiler of the disk situated downstream therefrom, as is the case for the nozzles A and B and the pieces of sheet metal 60 and 64 respectively. On the contrary, the shapes of the sheet-metal sectors 66 of the nozzle C are adapted to enable them to co-operate directly by the baffle effect with the upstream spoiler 50 of the disk 18 so as to limit air leakage.

The support means for the abradable elements 44 shown in FIG. 2 are designed so as to be capable of replacing the support means of the prior art (FIG. 1), i.e. the support means of the invention are adapted by virtue of their shape and their configuration to the environment of the turbine 1 so as to be mounted therein instead of the existing support means. This replacement may be performed during a maintenance operation on the turbine.

Figure 3:
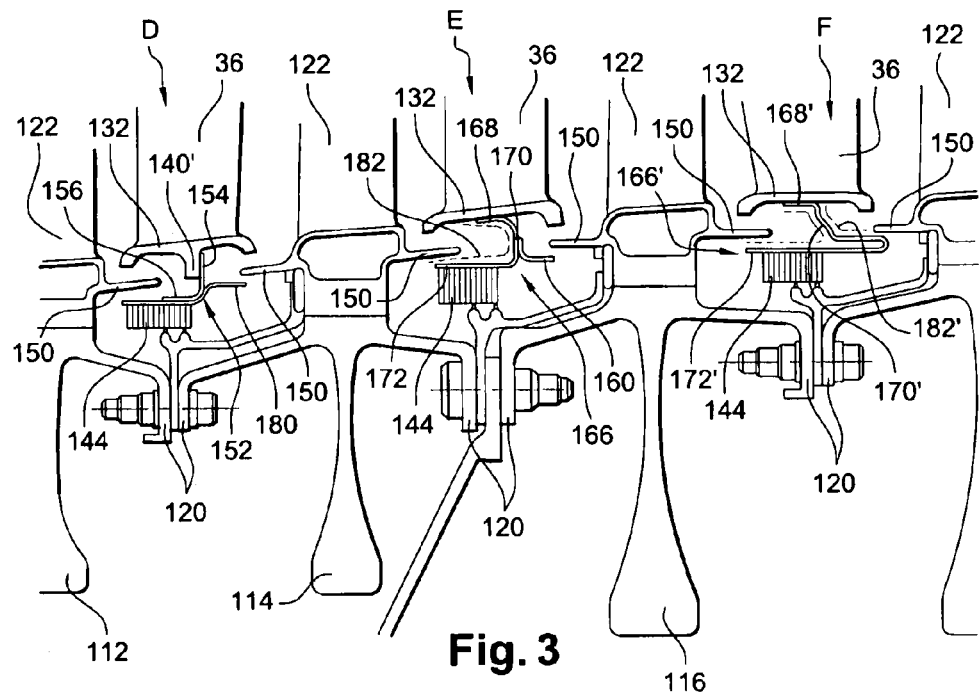
FIG. 3 is a view corresponding to FIG. 2 and showing embodiment variants of the invention.

In the embodiment variants shown in FIG. 3, because of the small radial and axial extent of the support means of the invention for supporting abradable elements, the turbine rotor has been redesigned so as to diminish the radial dimensions of the turbine and thus diminish the weight of the turbine. The fastener flanges 120 of the disks have in particular been reconfigured and redimensioned so that the wipers 46 of the plates 28 are closer to the inner peripheries of the rows of movable blades 122.

The sheet-metal sectors supporting the abradable elements in FIG. 3 thus present smaller radial dimensions than the sheet-metal sectors in FIG. 2.

The platform 132 of the nozzle D is similar to that of the nozzle A in FIG. 2. The sheet-metal sectors 152 of this nozzle are of L-shaped section, the radial wall 154 of each of these sectors being fastened by brazing or welding at its outer periphery to the downstream face of the inner radial rib 140' of the platform 132 of the nozzle. The cylindrical walls 156 of their sheet-metal sectors extend upstream from the inner peripheries of the radial walls 154, and their inside surfaces are pressed against the outside surface of another substantially cylindrical piece of sheet metal 180 and fastened thereto by welding or brazing. This other piece of sheet metal 180 extends in an axial direction radially inside and at a short radial distance from the downstream and upstream spoilers of the disks 112, 114 respectively in order to co-operate with said spoilers by the baffle effect. The elements 144 of abradable material are fastened to the inside surface of the piece of sheet metal 180.

The intermediate nozzle E of the turbine has annular sheet-metal sectors 166 of substantially C-shaped section having outer cylindrical walls 168 fastened by brazing or welding to the inside surface of the platform 132 of the nozzle C. The inner cylindrical walls 172 of the sheet-metal sectors 166 extend at their upstream ends radially inside and at a short radial distance from the downstream spoiler of the disk 114. These cylindrical walls 172 are not connected to an outer radial rim or to an additional piece of sheet metal for co-operating with the downstream spoiler 150 of the disk 114.

A substantially L-shaped annular piece of sheet metal 160 has its upstream end fastened to the downstream faces of the radial walls 170 of the sheet-metal sectors 166 and extends downstream radially inside and at a small radial distance from the upstream spoiler 150 of the disk 116.

The support means for the abradable elements 144 of the downstream nozzle F comprise sheet-metal sectors 166' similar to those of the nozzle C in FIG. 2, these support means not having any sheet metal pieces 74. Each sheet-metal sector 166' has an annular wall 170' connected at its outer periphery to a cylindrical rim 168' fastened to the platform 132 and its inner periphery to a cylindrical wall 172' carrying abradable material elements 144, this sheet-metal sector 166' corresponding to the sheet-metal sector 66 in FIG. 2, after flattening or reduction of its radial size, and it extends in the vicinity of the spoiler 150 in order to limit air leakage.

The platforms 32, 132 of the nozzles are each formed by a sectorized cylindrical wall made up of a plurality of sectors placed circumferentially end to end one after another. The annular pieces of sheet metal 60, 64, 74, 180, and 160 are likewise sectorized. The sectors of the inner platforms 32, 132 and of the annular pieces of sheet metal 52, 52', 66, 152, 166, 166', and 60, 64, 74, 180, 160 are of dimensions in the radial direction that are substantially identical and they are in alignment with one another in the radial direction.

Sealing between the sectors of the platforms is provided by means of strips that are fastened by brazing or welding at one end to a platform sector and that are pressed in sliding contact at the other end against an adjacent platform sector. These strips are represented diagrammatically by dashed lines 182, 182' in FIG. 3.

Sealing strips 182 of substantially C-shaped section are arranged radially inside the platform 132 of the nozzle E, upstream from the sheet-metal sectors 166'. Each strip has its radially-outer end fastened to the inside surface of a platform and is slidably mounted in the circumferential direction on the inside surface of an adjacent platform. These strips 182 are shaped to match with little clearance the shapes of the sheet-metal sectors 166 in the gaps between two adjacent sheet-metal sectors so as to limit the flow of gas through the gaps.

Sealing strips 182' are arranged upstream and downstream from the sheet-metal sectors 166' of the nozzle F, their radially-outer ends being fastened to the platform 132 of the nozzle as described above. These sealing strips are also arranged in the inter-sector gaps between the sheet-metal sectors 166' to limit the flow of gas between these sectors.

All of the sheet-metal sectors 52, 52', 70, 152, 166, 166' may be covered upstream and/or downstream by sealing strips of this type that have their radially-outer ends fastened to the inner platforms of the nozzles.

The invention claimed is:

1. A turbine nozzle for a turbomachine, the nozzle comprising:
    two annular platforms, respectively an inner platform and an outer platform, interconnected by substantially radial vanes, the inner platform carrying annular elements of abradable material for co-operating with annular wipers of a rotor of the turbomachine to form a labyrinth type seal,
    wherein the annular elements of abradable material are carried by annular sheet-metal sectors of substantially L-, S-, or C-shaped section that are mounted radially inside the inner platform and each of which has an outer periphery having a first weld or brazed joint with the inner platform and an inner periphery having a second weld or brazed joint with an element of abradable material or to a piece of sheet metal fastened to an element of abradable material.

2. A nozzle according to claim 1, wherein each sheet-metal sector includes a radial wall with a cylindrical inner peripheral rim and is fastened via its outer peripheral edge to the inner platform.

3. A nozzle according to claim 2, wherein the outer periphery of the radial wall of each sheet-metal sector is pressed against and fastened to an inner radial rib of the platform.

4. A nozzle according to claim 2, wherein each sheet-metal sector includes a cylindrical outer peripheral rim pressed against and fastened to an inside surface of the inner platform.

5. A nozzle according to claim 2, wherein the abradable material elements are fastened to inside surfaces of the cylindrical rims of the sheet-metal sectors.

6. A nozzle according to claim 2, wherein each sheet-metal sector includes a rim extending towards the adjacent rotor disks to oppose hot gas escaping towards the rotor.

7. A nozzle according to claim 6, wherein the rims of the sheet-metal sectors are formed by annular pieces of sheet metal fastened to the sheet-metal sectors by brazing or welding.

8. A nozzle according to claim 1, wherein the inner platform includes a sectorized cylindrical wall, the sectors of the platform being castings and carrying sealing strips that are welded or brazed at one end on a platform sector and that are pressed in sliding contact at the other end against an adjacent platform sector in register with the sheet-metal sectors carrying the abradable material elements.

9. A turbomachine turbine, comprising at least one nozzle according to claim 1.

10. A turbomachine, comprising a turbine fitted with at least one nozzle according to claim 1.

\* \* \* \* \*